US012657352B2

(12) United States Patent
Fujiwara et al.

(10) Patent No.: US 12,657,352 B2
(45) Date of Patent: Jun. 16, 2026

(54) CONSTRUCTION MODEL DATA EVALUATION SERVER, CONSTRUCTION MODEL DATA EVALUATION METHOD, AND CONSTRUCTION MODEL DATA EVALUATION SYSTEM

(71) Applicant: Hitachi, Ltd., Tokyo (JP)

(72) Inventors: Masayasu Fujiwara, Tokyo (JP); Takahiro Hatori, Tokyo (JP); Wataru Toriumi, Tokyo (JP); Tomoaki Maehara, Tokyo (JP); Takamichi Hoshino, Tokyo (JP); Satoru Toriyabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1252 days.

(21) Appl. No.: 17/594,676

(22) PCT Filed: Apr. 9, 2020

(86) PCT No.: PCT/JP2020/015928
§ 371 (c)(1),
(2) Date: Oct. 26, 2021

(87) PCT Pub. No.: WO2020/241080
PCT Pub. Date: Dec. 3, 2020

(65) Prior Publication Data
US 2022/0207203 A1 Jun. 30, 2022

(30) Foreign Application Priority Data
May 29, 2019 (JP) ................................. 2019-099935

(51) Int. Cl.
*G06F 30/13* (2020.01)
*G06F 30/20* (2020.01)
(Continued)

(52) U.S. Cl.
CPC .............. *G06F 30/13* (2020.01); *G06F 30/20* (2020.01); *B66B 19/00* (2013.01); *G06F 2111/02* (2020.01); *G06F 2111/20* (2020.01)

(58) Field of Classification Search
CPC ...... G06F 30/13; G06F 30/20; G06F 2111/02; G06F 2111/20; B66B 19/00
(Continued)

(56) References Cited

U.S. PATENT DOCUMENTS 6,885,367 B1 4/2005 Fujieda
10,063,529 B2 * 8/2018 Milazzo ................. B29C 64/00
(Continued)

FOREIGN PATENT DOCUMENTS

CN 103514409 A 1/2014
JP 2001-155186 A 6/2001
(Continued)

OTHER PUBLICATIONS

Chan, Mo-Che, et al. "Group-based peer-to-peer 3D streaming authentication." 2009 15th International Conference on Parallel and Distributed Systems. IEEE, 2009. (Year: 2009).*
(Continued)

*Primary Examiner* — John E Johansen
(74) *Attorney, Agent, or Firm* — Crowell & Moring LLP

(57) ABSTRACT

This construction model data evaluation server is provided with: a construction model part detection unit which receives construction model data used in a client terminal and detects an elevator construction model part included in the construction model data; a properness determination unit which performs properness determination on the elevator construction model part; and an evaluation processing unit which transmits, to the client terminal, evaluation result data including an evaluation result obtained by evaluating the construction model data when a determination result of the
(Continued)

4 properness determination and the construction model data are received.

9 Claims, 7 Drawing Sheets

(51) Int. Cl.
  *G06F 111/02*      (2020.01)
  *G06F 111/20*      (2020.01)
  *B66B 19/00*      (2006.01)
(58) Field of Classification Search
  USPC ............................................................ 703/1
  See application file for complete search history.

(56)                References Cited

U.S. PATENT DOCUMENTS

| | | | |
|---|---|---|---|
| 10,776,880 B2 * | 9/2020 | Dalal ..................... | G06N 3/045 |
| 2015/0284214 A1 * | 10/2015 | Park ...................... | B66B 5/0025 |
| | | | 187/393 |
| 2018/0276323 A1 | 9/2018 | Lutz et al. | |

FOREIGN PATENT DOCUMENTS

| | | | |
|---|---|---|---|
| JP | 2006-166186 A | 6/2006 |
| JP | 2009-48565 A | 3/2009 |
| JP | 2014-10659 A | 1/2014 |

OTHER PUBLICATIONS

International Search Report (PCT/ISA/210) issued in PCT Application No. PCT/JP2020/015928 dated Jul. 7, 2020 with English translation (four (4) pages).
Japanese-language Written Opinion (PCT/ISA/237) issued in PCT Application No. PCT/JP2020/015928 dated Jul. 7, 2020 (three (3) pages).
Chinese-language Office Action issued in Chinese Application No. 202080027964.9 dated May 6, 2023 with English translation (13 pages).
Extended European Search Report issued in European Application No. 20814177.0 dated May 25, 2023 (9 pages).

* cited by examiner

*FIG. 2*    4

CONSTRUCTION MODEL DATA EVALUATION SERVER, CONSTRUCTION MODEL DATA EVALUATION METHOD, AND CONSTRUCTION MODEL DATA EVALUATION SYSTEM

TECHNICAL FIELD

The present invention relates to a construction model data evaluation server, a construction model data evaluation method, and a construction model data evaluation system.

BACKGROUND ART

In planning and construction of high-rise buildings, construction model data called building information modeling (BIM) data is utilized, for example, to promote information sharing among parties. Here, phrases used herein are defined. Construction model data refers to data including a plurality of construction model parts. A construction model part refers to data indicating a facility such as a building material, an elevator, and a passenger conveyor constituting a high-rise building. Information constituting the construction model part includes at least 2D or 3D shape data, and may include any pieces of accompanying information such as a specification, a model number, and a manufacturer. The construction model data shall also include general BIM data. Among the construction model parts, a part indicating an elevator is particularly referred to as an elevator construction model part.

Conventionally, there has been a demand for improving the efficiency of planning of elevator installation in planning of a high-rise building. Therefore, an elevator manufacturer provides the elevator construction model part to an owner and a designer of a high-rise building. By using the construction model part provided by the elevator manufacturer, the owner and the designer can make a more specific plan on the basis of the shape and specification of an elevator that can actually be procured.

For example, Patent Literature 1 discloses a construction model system that evaluates construction model data incorporating an elevator construction model part using a technique such as simulation.

CITATION LIST

Patent Literature

Patent Literature 1: JP 2014-10659 A

SUMMARY OF INVENTION

Technical Problem

In the BIM system disclosed in Patent Literature 1, it is assumed that an elevator construction model part is generated in the BIM system. However, in an actual operation, a designer often takes in an elevator construction model part provided by an elevator manufacturer instead of one generated in the BIM system and establishes construction model data using a system other than the BIM system. In such a way of using the construction model part, it is necessary to confirm whether or not the elevator construction model part included in the construction model data input in the other system is a proper one provided by the elevator manufacturer. However, in the BIM system disclosed in Patent Literature 1, it is not possible to confirm whether or not the elevator construction model part is proper data.

A facility such as an elevator represented by a proper construction model part has already been commercialized by an elevator manufacturer and is guaranteed to be ready for being delivered to an owner by the elevator manufacturer. However, a facility represented by a non-proper construction model part provided by another elevator manufacturer cannot be guaranteed whether or not to be ready for being actually delivered. Also, functions, parameters, and the like set in the non-proper construction model part may possibly be insufficient. Conventionally, it has not been considered to change the content of evaluation and the content of output depending on whether or not the elevator construction model part is proper. For this reason, there is a possibility that the user is informed that a function can be fulfilled although the function cannot be fulfilled because the facility is one represented by the non-proper construction model part.

The present invention has been made in view of such a situation, and an object thereof is to appropriately evaluate construction model data used in a client terminal.

Solution to Problem

A construction model data evaluation server according to the present invention evaluates construction model data used in a client terminal. This construction model data evaluation server is provided with: a construction model part detection unit which receives construction model data and detects a construction model part included in the construction model data; a properness determination unit which performs properness determination on the construction model part; and an evaluation processing unit which transmits, to a client terminal, evaluation result data including an evaluation result obtained by evaluating the construction model data when a determination result of the properness determination and the construction model data are received.

Advantageous Effects of Invention

According to the present invention, it is possible to determine whether or not a construction model part included in input construction model data is proper, and transmit, to a client terminal, an evaluation result obtained by evaluating the construction model data on the basis of a determination result.

Problems, configurations, and effects other than those described above will be clarified by the following description of embodiments.

DESCRIPTION OF EMBODIMENTS

Hereinbelow, embodiments of the present invention will be described with reference to the accompanying drawings. In the present specification and the drawings, components having substantially the same function or configuration are labeled with the same reference signs, and redundant description is omitted.

First Embodiment

First, a configuration example and an operation example of a construction model data evaluation system according to a first embodiment of the present invention will be described.

Figure 1:
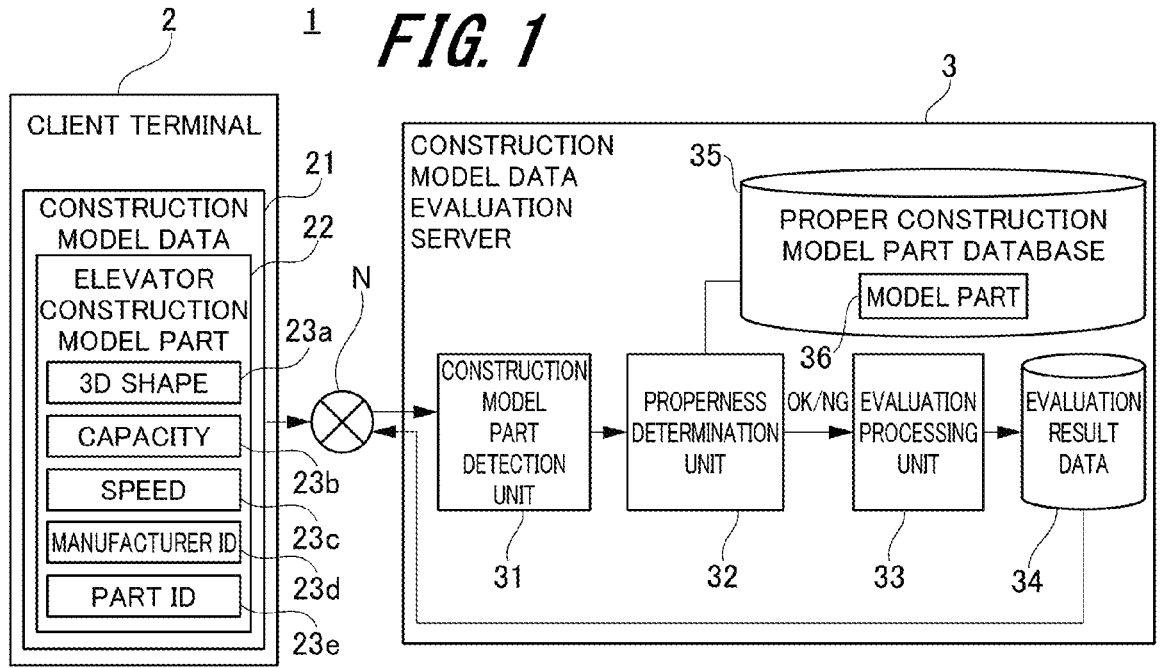
FIG. 1 is a block diagram illustrating a configuration example of a construction model data evaluation system according to a first embodiment of the present invention.

FIG. 1 is a block diagram illustrating a configuration example of a construction model data evaluation system 1 according to the first embodiment.

The construction model data evaluation system 1 includes a client terminal 2 and a construction model data evaluation server 3. The client terminal 2 and the construction model data evaluation server 3 are connected via a network N so as to be able to transmit and receive various data to and from each other. The construction model data evaluation system 1 evaluates construction model data 21 input from the client terminal 2. The evaluation of the construction model data 21 is, for example, to evaluate waiting time of an elevator represented by the construction model data 21, noise generated when an elevator car moves up and down, and a flow of fluid (air) around the elevator car.

The client terminal 2 is used, for example, by an owner or a designer who plans construction of a high-rise building. The client terminal 2 includes the construction model data 21. The construction model data 21 is recorded in, for example, a nonvolatile storage 47 (refer to FIG. 2 described below) provided in the client terminal 2.

The construction model data 21 includes an elevator construction model part 22. The elevator construction model part 22 is provided by an elevator manufacturer, and it is assumed that a construction designer or the like who creates the construction model data 21 takes in the elevator construction model part 22 having specifications required for the construction model data 21.

The elevator construction model part 22 includes at least a 3D shape 23*a*, a capacity 23*b*, a speed 23*c*, a manufacturer ID 23*d*, and a part ID 23*e* as specification information about a facility or the like used in the elevator.

The 3D shape 23*a* is, for example, data indicating a 3D shape of the elevator.

The capacity 23*b* is data indicating riding capacity of the elevator car.

The speed 23*c* is data indicating moving speed of the elevator car.

The manufacturer ID 23*d* is data allocated to allow an elevator manufacturer that has provided the elevator construction model part 22 to be uniquely identified.

The part ID 23*e* is data allocated to allow the elevator construction model part 22 to be uniquely identified.

In the present embodiment, an elevator manufacturer that is an operation entity of the construction model data evaluation server 3 is referred to as "a subject company". As described above, in the client terminal 2, the construction model data 21 using the elevator construction model part 22 that the subject company has provided is created. However, in the client terminal 2, the construction model data 21 using the elevator construction model part 22 that a different manufacturer (hereinbelow referred to as "a different company") has provided may be created.

The elevator manufacturer cannot evaluate the safety or the like of a building to be built using the construction model data 21 unless confirming whether the construction model data 21 created in the client terminal 2 is one that uses the elevator construction model part 22 that the subject company has provided. Therefore, prior to evaluation of the construction model data 21 created in the client terminal 2, the construction model data evaluation server 3 determines whether or not the elevator construction model part 22 constituting the construction model data 21 is proper.

The construction model data evaluation server 3 includes at least an elevator construction model part detection unit 31, a properness determination unit 32, an evaluation processing unit 33, evaluation result data 34, and a proper construction model part database 35.

When construction of a building is started by means of an establishment system using the construction model data 21 in the client terminal 2, the construction model data 21 is transmitted from the client terminal 2 to the construction model data evaluation server 3. Also, the client terminal 2 outputs an evaluation result extracted from the evaluation result data 34 received from the construction model data evaluation server 3.

The elevator construction model part detection unit 31 receives the construction model data 21 to be used in the client terminal 2 received from the client terminal 2 via the network N and detects the elevator construction model part 22 included in the construction model data 21. In the figure, the elevator construction model part detection unit 31 is abbreviated as a "construction model part detection unit".

The properness determination unit 32 determines whether or not the elevator construction model part 22 detected by the elevator construction model part detection unit 31 is proper (also referred to as "properness determination"), and outputs a determination result to the evaluation processing unit 33. In this determination, the properness determination unit 32 refers to the proper construction model part database 35. In a case where the specification information of the input elevator construction model part 22 matches the specification information constituting the elevator construction model part 22 included in the proper construction model part database 35 in whole or in a predetermined part, the properness determination unit 32 determines that the input elevator construction model part 22 is proper.

For example, in a case where the elevator construction model part 22 detected from the construction model data 21 is included in the proper construction model part database 35, the properness determination unit 32 determines that the elevator construction model part 22 is proper (OK). However, in a case where the elevator construction model part 22 detected from the construction model data 21 is not included in the proper construction model part database 35, the properness determination unit 32 determines that the elevator construction model part 22 is not proper (NG).

The evaluation processing unit 33 receives a determination result provided by the properness determination unit 32 and the construction model data 21 and obtains an evaluation result obtained by evaluating the construction model data 21 by performing evaluation processing such as simulation. The evaluation result for the construction model data 21 is output as the evaluation result data 34. The evaluation processing unit 33 then transmits the evaluation result data 34 including the evaluation result for the construction model data 21 to the client terminal 2. The evaluation of the construction model data 21 is performed, for example, by the evaluation processing unit 33 presenting whether or not or evaluation processing for the construction model data 21 is performed, changing parameters, and changing an output of an evaluation result on the basis of the determination result provided by the properness determination unit 32.

The evaluation result data 34 stores the evaluation result for the construction model data 21 provided by the evaluation processing unit 33. The construction model data evaluation server 3 then transmits the evaluation result data 34 to the client terminal 2 via the network N. The evaluation result data 34 also includes the determination result as to whether or not the elevator construction model part 22 used in the construction model data 21 is proper. For example, in a case where the elevator construction model part 22 is proper, being proper is recorded in the evaluation result data 34. However, in a case where the elevator construction model part 22 is not proper, an error is recorded in the evaluation result data 34.

Here, there is a case where, even when the elevator construction model part 22 used in the client terminal 2 is not proper, the evaluation processing unit 33 does not record an error in the evaluation result data 34 but records as safe a value as not to cause any trouble at the time of using the elevator construction model part 22 in the construction model data 21. Alternatively, in a case where the elevator construction model part 22 provided from a different company is used, a message notifying the user that the elevator manufacturer handles the case for value may be recorded.

The client terminal 2 can display the evaluation result for the elevator construction model part 22 on the basis of the evaluation result data 34 received from the construction model data evaluation server 3. Therefore, the user who uses the client terminal 2 can confirm the determination result as to whether or not the elevator construction model part 22 to be used is proper and the evaluation result for the construction model data 21.

The proper construction model part database 35 stores a proper elevator construction model part 36 that can be provided by the elevator manufacturer to the user. In the figure, the elevator construction model part 36 is abbreviated as a "model part". As described above, the proper elevator construction model part 36 is read at the time of the properness determination by means of the properness determination unit 32.

Meanwhile, the present embodiment employs a configuration in which the client terminal 2 and the construction model data evaluation server 3 are connected via the network N. However, available is a configuration in which one client terminal functions as both the client terminal 2 and the construction model data evaluation server 3.

The description of the configuration of the construction model data evaluation system 1 with reference to FIG. 1 ends.

Next, a hardware configuration of a computing machine 4 constituting each of the devices in the construction model data evaluation system 1 will be described.

Figure 2:
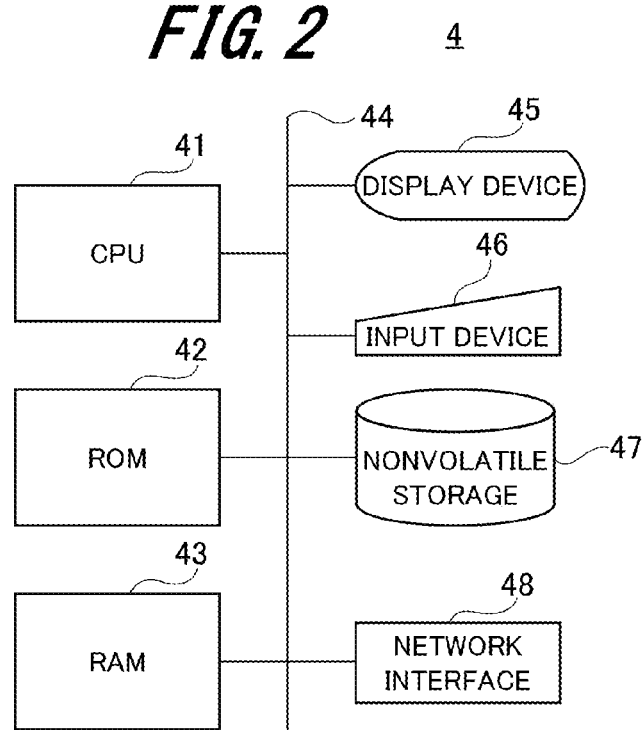
FIG. 2 is a block diagram illustrating a hardware configuration example of a computing machine according to an embodiment of the present invention.

FIG. 2 is a block diagram illustrating a hardware configuration example of the computing machine 4.

The computing machine 4 is hardware used as a so-called computer. The computing machine 4 includes a central processing unit (CPU) 41, a read only memory (ROM) 42, and a random access memory (RAM) 43 each connected to a bus 44. The computing machine 4 further includes a display device 45, an input device 46, a nonvolatile storage 47, and a network interface 48.

The CPU 41 reads program code of software that fulfills respective functions according to the present embodiment from the ROM 42, loads the program code into the RAM 43, and executes the program code. Variables, parameters, and the like generated during arithmetic processing of the CPU 41 are temporarily written into the RAM 43, and these variables, parameters, and the like are read by the CPU 41 as needed. The respective functions of the elevator construction model part detection unit 31, the properness determination unit 32, and the evaluation processing unit 33 in the construction model data evaluation server 3 are fulfilled by processing of the CPU 41.

The display device 45 is, for example, a liquid crystal display monitor, and displays a result and the like of processing performed in the computing machine 4 to the user. As the input device 46, a keyboard, a mouse, or the like is used, for example, with which the user can perform predetermined operation inputs and instructions. While the client terminal 2 includes the display device 45 and the input device 46, the construction model data evaluation server 3 may not include the display device 45 and the input device 46.

As the nonvolatile storage 47, a hard disk drive (HDD), a solid state drive (SSD), a flexible disk, an optical disk, a magneto-optical disk, a CD-ROM, a CD-R, a magnetic tape, or a nonvolatile memory is used, for example. The nonvolatile storage 47 has recorded therein not only an operating system (OS) and various parameters but also a program for causing the computing machine 4 to function. The ROM 42 and the nonvolatile storage 47 permanently record a program, data, and the like required for operation of the CPU 41, and are used as examples of a computer-readable nontransitory recording medium storing a program executed by the computing machine 4. For example, the construction model data 21 is recorded in the nonvolatile storage 47 included in the client terminal 2, and the proper construction model part database 35 is established in the nonvolatile storage 47 included in the construction model data evaluation server 3.

As the network interface 48, a network interface card (NIC) is used, for example. The network interface 48 can transmit and receive various data between the client terminal 2 and the construction model data evaluation server 3 via the network N connected to a terminal of the NIC.

Figure 3:
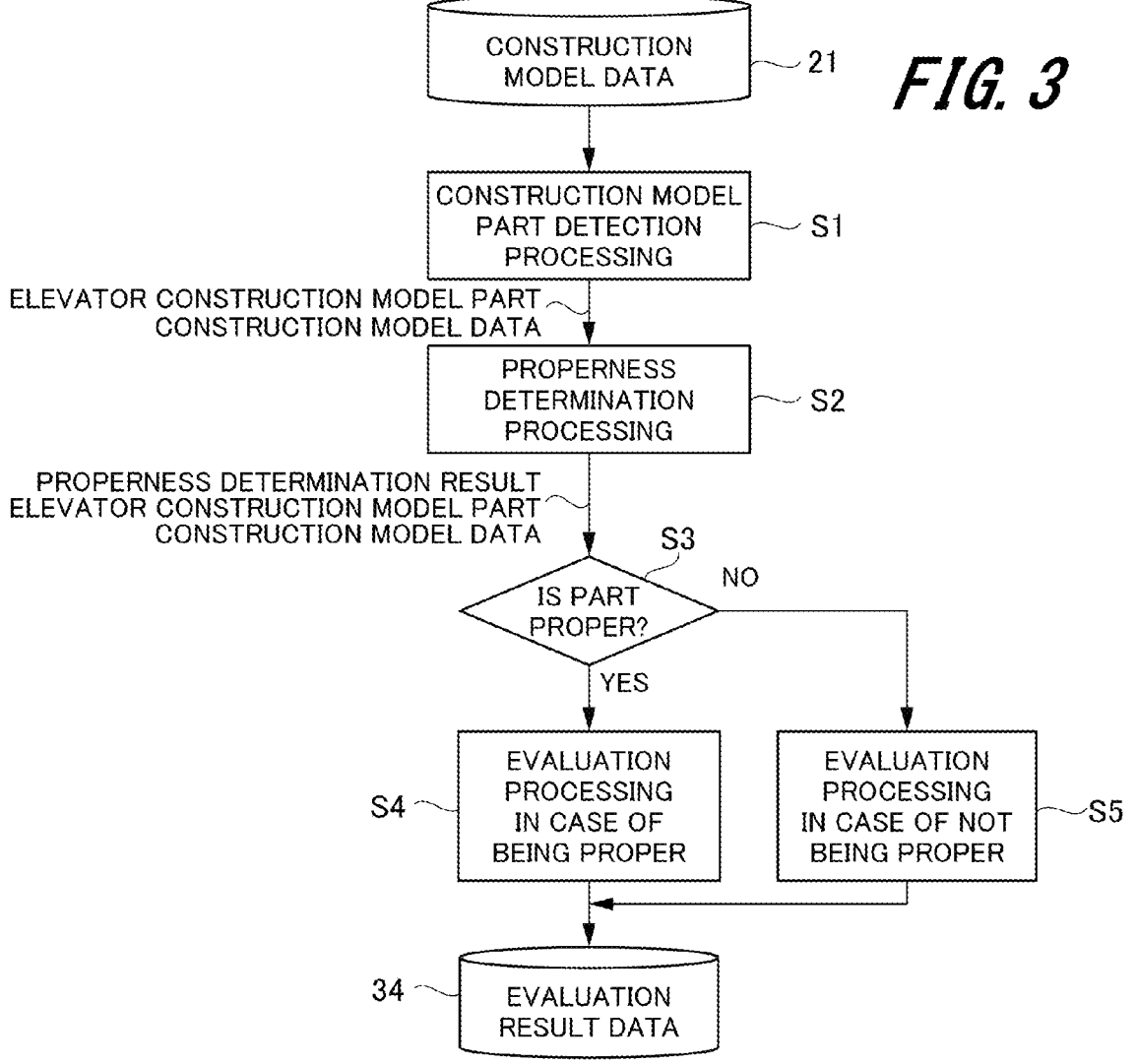
FIG. 3 is a flowchart illustrating an example of processing in which a construction model data evaluation server evaluates construction model data according to the first embodiment of the present invention.

Next, a flow of processing for evaluating the construction model data 21 in the construction model data evaluation server 3 according to the present invention is illustrated in FIG. 3, and will sequentially be described below.

FIG. 3 is a flowchart illustrating an example of processing in which the construction model data evaluation server 3 evaluates the construction model data 21.

The user designates the elevator construction model part 22 to be evaluated from the client terminal 2 to the construction model data evaluation server 3. In the construction model data evaluation server 3, the elevator construction model part detection unit 31 first executes elevator construction model part detection processing (S1) on the construction model data 21 input from the client terminal 2. In this processing, the elevator construction model part detection unit 31 detects the elevator construction model part 22 in the construction model data 21, and outputs the elevator construction model part 22 and the input construction model data 21 to the properness determination unit 32.

When a single or a plurality of elevator construction model part(s) 22 detected by the elevator construction model part detection unit 31 is/are input into the properness determination unit 32, the properness determination unit 32 executes properness determination processing (S2). The properness determination processing is performed by the properness determination unit 32 determining whether or not the input elevator construction model part 22 is proper data. Then, the properness determination unit 32 outputs a properness determination result indicating "proper (OK)" or "not proper (NG)" to the evaluation processing unit 33 for each input elevator construction model part 22. The properness determination unit 32 also outputs the input elevator construction model part 22 and construction model data 21 to the evaluation processing unit 33.

In a case where a provider who has provided the elevator construction model part 22 to the client terminal 2 and an operator of the construction model data evaluation server 3 are the same elevator manufacturer, the elevator construction model part 22 subjected to the properness determination and the proper elevator construction model part 36 may be considered to be the same. Therefore, in a case where the elevator construction model part 22 is one provided by the elevator manufacturer, the properness determination unit 32 determines that the elevator construction model part 22 is proper. However, in a case where the elevator construction model part 22 is one not provided by the elevator manufacturer but provided by a different company, the properness determination unit 32 determines that the elevator construction model part 22 is not proper.

The properness determination performed by the properness determination unit 32 in step S2 is performed on the basis of whether or not the elevator construction model part 22 input into the properness determination unit 32 matches the elevator construction model part 36 included in the proper construction model part database 35. In a case where a matching elevator construction model part 36 is found in the proper construction model part database 35, the properness determination unit 32 determines that the elevator construction model part 22 is proper, and in a case where no matching elevator construction model part 36 is found, the properness determination unit 32 determines that the elevator construction model part 22 is not proper.

In this determination, the properness determination unit 32 may confirm in advance if the combination of the manufacturer ID 23*d* and the part ID 23*e* included in the elevator construction model part 22 is one managed by the elevator manufacturer who has provided the elevator construction model part 22. In a case where the combination of the manufacturer ID 23*d* and the part ID 23*e* is one managed by the elevator manufacturer, the properness determination unit 32 may shift to the properness determination for the elevator construction model part 22, and in a case where the combination is not a managed one, the properness determination unit 32 may immediately determine that the elevator construction model part 22 is not proper.

After step S2, the evaluation processing unit 33 receives the construction model data 21, the elevator construction model part 22, and the properness determination result and lets the processing branch in accordance with the input properness determination result (S3). In a case where the elevator construction model part 22 is proper, the evaluation processing unit 33 performs evaluation processing for the construction model data 21 in a case of being proper (S4), and outputs the evaluation result data 34. On the other hand, in a case where the construction model data 21 is not proper, the evaluation processing unit 33 performs evaluation processing for the construction model data 21 in a case of not being proper (S5), and outputs the evaluation result data 34. The evaluation result data output from the evaluation processing unit 33 is provided to the client terminal 2.

In the evaluation processing performed by the evaluation processing unit 33 in steps S4 and S5, a known simulation technique or the like may be used. With the construction model data 21 including the proper elevator construction model part 22, the elevator manufacturer can grasp operation of the elevator product in detail and can thus accurately simulate the construction model data 21. However, in a case of the non-proper elevator construction model part 22, the elevator manufacturer may not be able to grasp operation of the elevator product. In addition, as for information about fine control operation and information explicitly set such as speed, variation in such operation or the like may not be guaranteed.

On the other hand, in a case where the non-proper elevator construction model part 22 is input into the evaluation processing unit 33, the construction model data 21 is more difficult to evaluate than in a case where the proper elevator construction model part 22 is input into the evaluation processing unit 33. However, the safety of the elevator product can preferably be ensured even in a case where the non-proper elevator construction model part 22 is included in the construction model data 21. For example, it is conceivable that the evaluation processing unit 33 outputs an evaluation result for the construction model data 21 with a large variation in the evaluation processing in step S5 for the construction model data 21 including the non-proper elevator construction model part 22.

Then, in a case where the properness determination unit 32 determines that the elevator construction model part 22 is not proper, the evaluation processing unit 33 does not evaluate the elevator construction model part 22. In this case, the evaluation processing unit 33 records an error message in the evaluation result data 34. Also, the evaluation processing unit 33 may record, in the evaluation result data 34, items to be improved so that the elevator construction model part 22 can be handled as a proper one. Since an error message and items to be improved are displayed on the client terminal 2 that has received such evaluation result data 34, the user can easily handle the case.

Also, in a case where the properness determination unit 32 determines that the elevator construction model part 22 is not proper, the evaluation processing unit 33 includes, in the evaluation result data 34, an evaluation result in which a variation in result of a simulation performed with different parameters from those used in the evaluation for the elevator construction model part 22 determined to be proper is large. For example, in the evaluation processing for the construction model data 21 including the non-proper elevator construction model part 22, the evaluation processing unit 33 sets a parameter expressing a variation, such as variance, to be high among the parameters of the model reproduced in the simulation in advance so as to obtain an evaluation result having a large variation. By doing such a setting, the evaluation processing unit 33 may output the evaluation result data 34 in consideration of the variation in the actual result.

Meanwhile, as parameters to be set differently from those at the time of evaluation for the proper elevator construction model part 22, conceivable are parameters with which the elevator manufacturer cannot confirm or guarantee operation in terms of specifications of a non-proper elevator. For example, in a case where an elevator is represented by the elevator construction model part 22, parameters are setting values and effective values for speed and acceleration of the elevator car. The evaluation processing unit 33 sets parameters to be high so as to be able to express a large variation in the speed and the acceleration of the elevator car and in the setting values and the effective values for the speed and the acceleration. Also, the evaluation processing unit 33 may output as an evaluation result whether the elevator control function is valid or invalid.

Also, in a case where the properness determination result is not being proper, the evaluation processing unit 33 may not perform evaluation processing in a case of not being proper but may output the evaluation result data 34 including an evaluation result indicating that the input elevator construction model part 22 is not proper. On the client terminal 2 that has received such evaluation result data 34 is displayed an evaluation result indicating that the elevator construction model part 22 is not proper. Accordingly, it is considered that the user of the client terminal 2 tries to obtain the proper elevator construction model part 22.

This is the end of description of the flow of processing for evaluating the construction model data 21 in the construction model data evaluation system 1.

In the construction model data evaluation system 1 according to the first embodiment described above, it is possible to detect whether or not the elevator construction model part 22 included in the construction model data 21 input from the client terminal 2 for evaluation is data assumed by the elevator manufacturer as an evaluation target.

Here, the properness determination unit 32 determines whether or not the elevator construction model part 22 included in the input construction model data 21 is proper. Depending on whether the elevator construction model part 22 is proper or not, the evaluation processing to be executed thereafter and the evaluation result data 34 to be output can be changed. Therefore, the client terminal 2 can appropriately represent the waiting time for the elevator represented in the construction model data 21 used in the client terminal 2 on the basis of the changed evaluation result data 34.

In a case where the elevator construction model part 22 is not proper, the evaluation processing unit 33 can leave the evaluation result data 34 not to be output or output to the client terminal 2 the evaluation result data 34 indicating that no evaluation can be performed due to not being proper. In the client terminal 2 that has received such evaluation result data 34, the result indicates that the elevator construction model part 22 is not proper, and the user is thus urged to use the proper elevator construction model part 22.

Also, even in a case where the elevator construction model part 22 is not proper, and where the evaluation processing unit 33 outputs the evaluation result data 34, the evaluation processing unit 33 performs a simulation using the elevator construction model part 22 with different parameters from those at the time of evaluating the proper elevator construction model part 22. In a case where the evaluation processing unit 33 performs a simulation with different parameters, it is desirable that the evaluation processing unit 33 can change an output content by, for example, outputting a result with a larger variation than a result using the proper elevator construction model part 22.

Also, the elevator manufacturer may provide various types of elevator construction model part 22 having different dimensions, shapes, capacity, speed, and the like. However, even in a case where various types of elevator construction model part 22 are provided to the client terminal 2, the properness determination unit 32 can efficiently confirm in a short time whether or not the elevator construction model part 22 included in the construction model data 21 input into the client terminal 2 is proper.

Also, the data format of the elevator construction model part 22 may be changed by software for editing the construction model data 21. Even in a case where the data format is changed, the properness determination unit 32 can confirm whether or not the elevator construction model part 22 is a proper elevator construction model part appropriately provided by the elevator manufacturer.

Also, FIG. 1 illustrates an example of a configuration in which the construction model data 21 is stored in the client terminal 2 and in which the construction model data 21 is transmitted from the client terminal 2 to the construction model data evaluation server 3. However, the construction model data 21 may be stored in advance in the construction model data evaluation server 3, and the construction model data 21 to be evaluated may be designated from the client terminal 2.

First Modification Example of First Embodiment

Note that, even in a case where the entire elevator construction model parts 22 and 36 do not match, the properness determination unit 32 may determine that the elevator construction model part 22 is proper in a case where the elevator construction model parts match in terms of several items such as the outer dimension of the shape, the capacity, and the speed among items that can be extracted from the elevator construction model part 22 specified in advance.

Here, criteria for the properness determination for the elevator construction model part 22 will be described.

Figure 4:
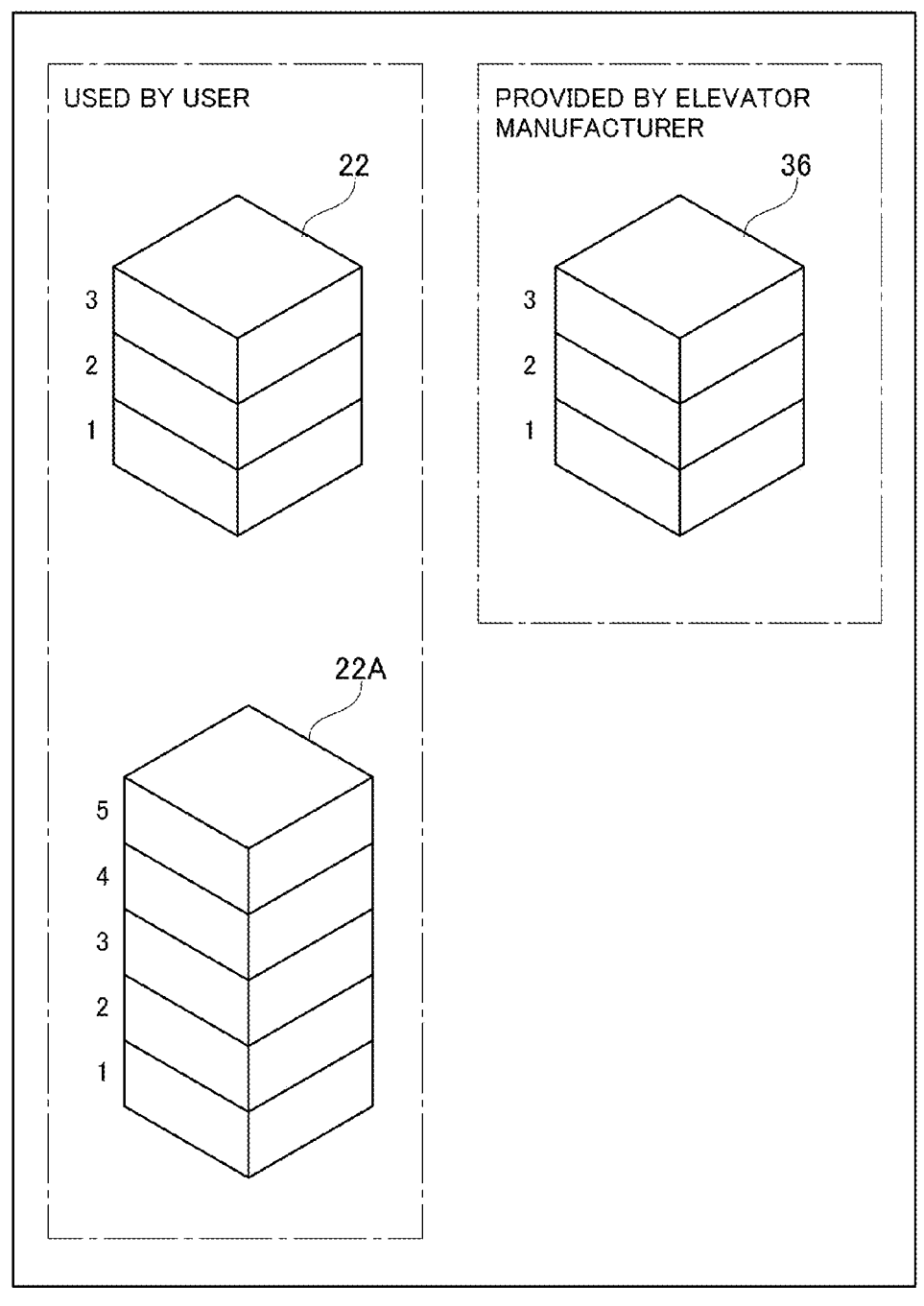
FIG. 4 is a diagram illustrating examples of an elevator construction model part used in a client terminal and an elevator construction model part provided by an elevator manufacturer according to the first embodiment of the present invention.

FIG. 4 is a diagram illustrating examples of the elevator construction model part 22 used in the client terminal 2 and the elevator construction model part 36 provided by the elevator manufacturer.

An example of the elevator construction model part 22 used by the user is illustrated on the left side of FIG. 4. For example, suppose that the elevator construction model part 22 for designing an elevator that can move among three floors is used in the client terminal 2.

An example of the elevator construction model part 36 provided by the elevator manufacturer is illustrated on the right side of FIG. 4. The elevator construction model part 36 provided by the elevator manufacturer is also used to design an elevator that can move among three floors. The elevator construction model part 22 used by the user and the elevator construction model part 36 provided by the elevator manufacturer are the same. In this manner, in a case where all pieces of specification information of the elevator construction model parts 22 and 36 match, the properness determination unit 32 can determine that the elevator construction model part 22 is proper.

Note that the user can change the elevator construction model part 36 provided by the elevator manufacturer within a determined range. For example, an elevator construction model part 22A used by the user can be created by increasing or decreasing the number of floors in the elevator construction model part 22 so as to be used to design an elevator that can move among five floors.

An example of the elevator construction model part 22A changed for use in designing an elevator that can move among five floors is illustrated at the lower left of FIG. 4. Even in this case, in a case where predetermined portions of the specification information of the elevator construction model parts 22A and 36 match, the properness determination unit 32 can determine that the elevator construction model parts 22A and 36 are the same and determine that the elevator construction model part 22A is proper.

Such criteria for whether or not the elevator construction model part 22 is proper can arbitrarily be set between the provider of the construction model data 21 and the operator of the construction model data evaluation server 3. However, the properness determination unit 32 cannot determine that the elevator construction model part 22 changed so as to deviate from the predetermined range is the same as the elevator construction model part 36. For example, in a case where the user changes the elevator construction model part 22 into a form in which an elevator can move among twenty floors, the elevator manufacturer cannot guarantee the performance of the elevator represented by the changed elevator construction model part 22. In such a case, even in a case where the manufacturer ID 23d and the part ID 23e of the elevator construction model part 22 match those of the elevator construction model part 36, it is determined that the elevator construction model part 22 is not proper.

Second Modification Example of First Embodiment

A system may be employed in which the construction model data 21 is stored in an external database or the like.

This system will be described with reference to FIG. 5.

Figure 5:
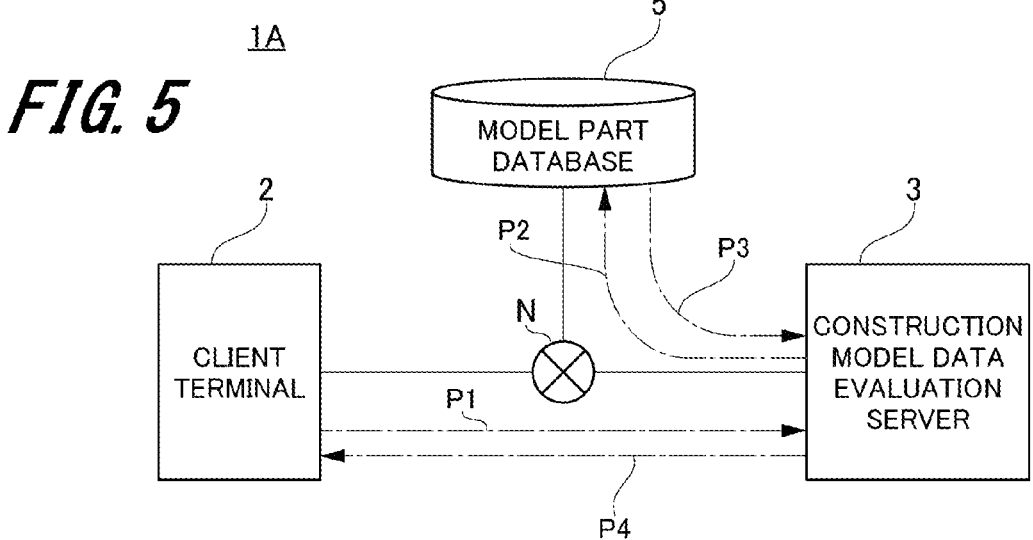
FIG. 5 is a block diagram illustrating a configuration example of a construction model data evaluation system according to a second modification example of the first embodiment of the present invention.

FIG. 5 is a diagram illustrating a configuration example of a construction model data evaluation system 1A according to a second modification example.

The construction model data evaluation system 1A includes a model part database 5 in addition to the client terminal 2 and the construction model data evaluation server 3 in the construction model data evaluation system 1 according to the first embodiment.

The model part database 5 has stored therein the elevator construction model parts 22 and 36 illustrated in FIG. 1 to be recorded in the model part database 5. The model part database 5 may have stored therein a non-proper elevator construction model part 22 as well as a proper elevator construction model part 22. The model part database 5 has also stored therein the construction model data 21 received from the client terminal 2 in advance.

When the client terminal 2 uses the construction model data 21, the client terminal 2 first requests the construction model data evaluation server 3 to evaluate the construction model data 21 recorded in the model part database 5 through a path P1. At this time, the client terminal 2 transmits an identifier of the construction model data 21 to be used in the client terminal 2 to the construction model data evaluation server 3 through the path P1. The identifier of the elevator construction model data 21 is used to uniquely identify the elevator construction model data 21. The construction model data evaluation server 3 transmits only the identifier of the elevator construction model data 21 received from the client terminal 2 to the model part database 5 through a path P2.

The model part database 5 searches for the construction model data 21 corresponding to the identifier received from the construction model data evaluation server 3, and transmits the construction model data 21 to the construction model data evaluation server 3 through a path P3. The model part database 5 also searches for the elevator construction model part 36 corresponding to the elevator construction model part 22 included in the construction model data 21, and transmits the elevator construction model part 36 to the construction model data evaluation server 3.

Subsequently, the elevator construction model part detection unit 31 of the construction model data evaluation server 3 receives the construction model data 21 corresponding to the identifier searched by the model part database 5 on the basis of the identifier and the proper elevator construction model part 36 included in the construction model data 21. At this time, the elevator construction model part detection unit 31 detects the elevator construction model part 22 from the construction model data 21.

The properness determination unit 32 confirms whether the elevator construction model parts 22 and 36 detected and received by the elevator construction model part detection unit 31 are the same. The properness determination unit 32 determines that the elevator construction model part 22 is proper in a case where they are the same, and determines that the elevator construction model part 22 is not proper in a case where they are not the same.

Thereafter, the evaluation processing for the elevator construction model part 22 is performed in a similar manner to that in the construction model data evaluation server 3 illustrated in FIG. 1. In the construction model data evaluation system 1A according to the second modification example, the model part database 5 has stored therein the construction model data 21 and the elevator construction model part 36 separately from the construction model data evaluation server 3. Therefore, the construction model data evaluation server 3 does not need to prepare a large number of pieces of construction model data 21 and elevator construction model parts 36.

Second Embodiment

Next, a configuration example of a construction model data evaluation system according to a second embodiment of the present invention will be described with reference to FIG. 6. Detailed description of the parts already described in the first embodiment will be omitted. In the construction model data evaluation system according to the present embodiment, it is possible to determine whether or not the elevator construction model part is proper by using a summary value given to the elevator construction model part in advance by the elevator manufacturer. Hereinbelow, a configuration example and an operation example of the construction model data evaluation system will be described.

Figure 6:
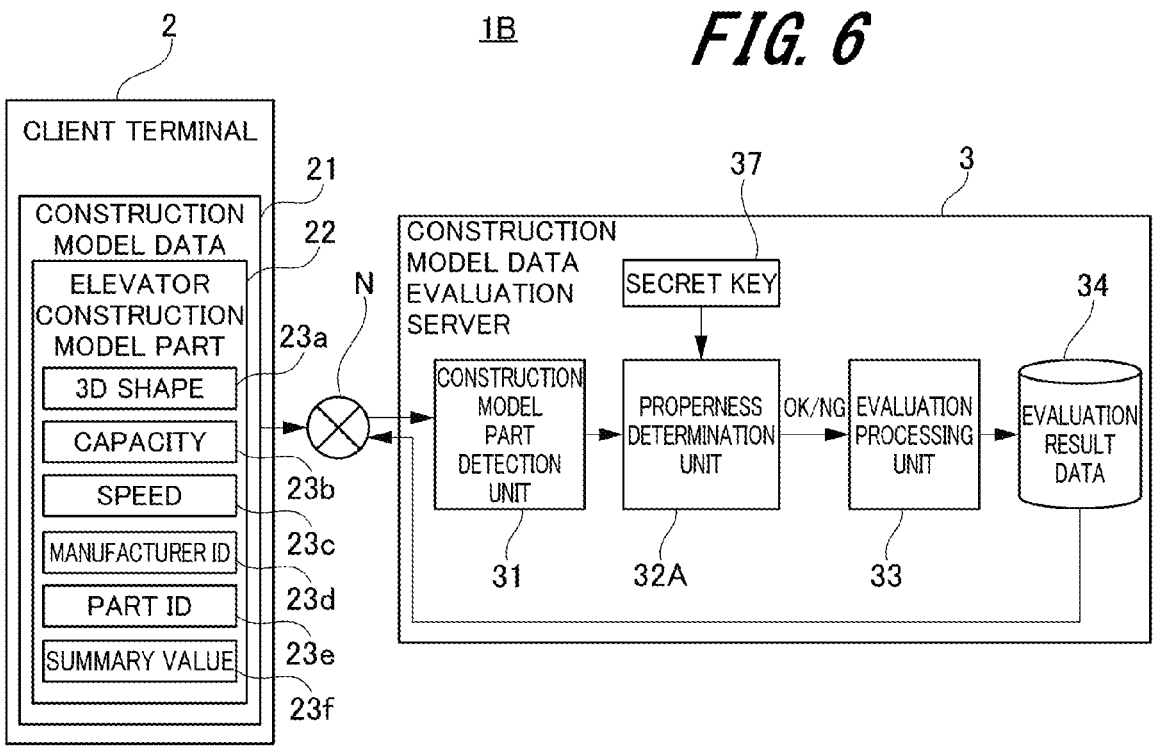
FIG. 6 is a block diagram illustrating a configuration example of a construction model data evaluation system according to a second embodiment of the present invention.

FIG. 6 is a block diagram illustrating a configuration example of a construction model data evaluation system 1B.

Similarly to the construction model data evaluation system 1 according to the first embodiment, the construction model data evaluation system 1B includes the client terminal 2 and the construction model data evaluation server 3 connected via the network N so as to be able to transmit and receive data.

The elevator construction model part 22 included in the client terminal 2 includes a summary value 23f in addition to the 3D shape 23a, the capacity 23b, the speed 23c, the manufacturer ID 23d, and the part ID 23e. The summary value 23f is information obtained by summarizing the specification information of the elevator construction model part 22, and is a value calculated in advance by the elevator manufacturer on the basis of the elevator construction model part 36. The summary value 23f is provided to the client terminal 2 in a state in which the elevator manufacturer sets the summary value 23f in the elevator construction model part 22. A detailed method for calculating the summary value 23f will be described below.

The construction model data evaluation server 3 includes the elevator construction model part detection unit 31, a properness determination unit 32A, the evaluation processing unit 33, and the evaluation result data 34, and further includes a secret key 37. The secret key 37 is information used when the properness determination unit 32A calculates the summary value, and is information that is not disclosed to the public. Therefore, since a third party other than the elevator manufacturer does not know the secret key 37, the third party cannot give the proper summary value 23f to the elevator construction model part 22. Therefore, when the elevator manufacturer calculates the summary value 23f, it is important for the elevator manufacturer not to disclose the secret key 37 to the outside other than the construction model data evaluation server 3.

In the construction model data evaluation system 1B, processing for evaluating the construction model data 21 is performed in a similar manner to that in the construction model data evaluation system 1 according to the first embodiment described with reference to FIG. 3. Here, different points from those in the processing in the construction model data evaluation system 1 will be described.

The properness determination unit 32A according to the present embodiment performs properness determination for the elevator construction model part 22 by referring to the summary value 23f included in the elevator construction model part 22. For example, in a case where a summary value calculated using the input elevator construction model part 22 and the secret key 37 is the same as the summary value 23f preset in the elevator construction model part 22, the properness determination unit 32A determines that the input elevator construction model part 22 is proper. Now, a method for calculating the summary value 23f and a method for determining properness will sequentially be described.

First, a method for calculating the summary value 23f given to the elevator construction model part 22 will be described.

A method for calculating the summary value 23f performed in advance by the elevator manufacturer is basically similar to the summary value calculation processing performed by the properness determination unit 32A. The elevator manufacturer converts a piece of specification information, among the pieces of specification information constituting the elevator construction model part 22, that the properness determination unit 32A targets in the summary value calculation, and data similar to the secret key 37, into one byte sequence in a similar manner to that in the summary value calculation performed by the properness determination unit 32A. The elevator manufacturer then calculates the summary value 23f from the converted byte sequence by using the same summary value calculation method such as Bcrypt as that used in the properness determination unit 32A.

Here, in a case where data similar to the secret key 37 is not given to the byte sequence, a third party can calculate the same summary value 23f using the same summary value calculation method. In this case, the properness determination unit 32A cannot use the summary value 23f given to the elevator construction model part 22 for determination of whether or not the summary value 23f is information set in the proper elevator construction model part 22.

To avoid this, the construction model data evaluation server 3 has the secret key 37 that is not disclosed to the outside. Even in a case where a third party refers only to the summary value 23f from the elevator construction model part 22, it is not easy to restore an original byte sequence with which the summary value 23f is calculated. Since the elevator manufacturer calculates the summary value 23f using data similar to the secret key 37, the construction model data evaluation server 3 can determine whether or not the construction model data 21 is the proper construction model data 21 using the summary value 23f set in the elevator construction model part 22.

Next, a method for determining properness performed by the properness determination unit 32A will be described.

The properness determination unit 32A converts the specification information referred to from the elevator construction model part 22 in order to obtain the summary value 23f and the information of the secret key 37 stored in the construction model data evaluation server 3 into one byte sequence connected in an order determined in advance by the elevator manufacturer.

The properness determination unit 32A then calculates a summary value from the converted byte sequence by using a known algorithm such as BCrypt or a software module. In the processing in which the properness determination unit 32A calculates the summary value, the same known algorithm such as BCrypt or software module as that used when the elevator manufacturer calculates the summary value 23f in advance is used. Subsequently, the properness determination unit 32A determines whether or not the elevator construction model part 22 is proper data on the basis of whether or not the calculated summary value matches the summary value 23f set in the elevator construction model part 22.

Specifically, in a case where the summary value calculated from the specification information constituting the elevator construction model part 22 and the summary value 23f set in the elevator construction model part 22 are information generated from the same byte sequence and match each other, the properness determination unit 32A determines that the elevator construction model part 22 is proper. On the other hand, in a case where the summary value calculated from the specification information and the summary value 23f set in the elevator construction model part 22 are not information generated from the same byte sequence and do not match each other, the properness determination unit 32A determines that the elevator construction model part 22 is not proper.

Subsequently, on the basis of the determination result provided by the properness determination unit 32A, the evaluation processing unit 33 outputs an evaluation result for the summary value 23f set in the elevator construction model part 22 to the client terminal 2. Therefore, the client terminal 2 can notify the user of whether or not the used elevator construction model part 22 is proper.

Note that information used for calculation of the summary value 23f among the pieces of specification information constituting the elevator construction model part 22 may be limited by the operator (mainly the elevator manufacturer) of the construction model data evaluation server 3. Since the information is limited, the summary value 23f of the elevator construction model part 22 is the same as the summary value calculated by the properness determination unit 32 before and after the file format of the construction model data 21 is changed. In a case where the summary value 23f of the elevator construction model part 22 is the same as the summary value calculated by the properness determination unit 32 before and after the file format of the construction model data 21 is changed, the properness determination unit 32 determines that the input elevator construction model part 22 is proper.

In particular, as for a BIM part of an elevator, as many elevator shafts and doors as the number of service floors are required, and the shapes of the elevator shaft and the door differ depending on the setting of the BIM part. Under such circumstances, in a case where a specification of information targeted for calculation of the summary value 23f, allowed to be changed such as an increase or decrease of the number of service floors, is changed, the summary value 23f to be calculated may not be changed. Therefore, even in a case where a piece of data of a specification part allowed in advance to be changed among the pieces of data constituting the elevator construction model part 22 is changed, the summary value 23f set in advance in the elevator construction model part 22 can be the same as the summary value calculated by the properness determination unit 32.

Specifically, it is conceivable to limit the 3D shape 23a targeted for calculation of the summary value 23f to only a shape of a single floor (for example, an entrance hall floor) that is not affected by setting of the number of service floors. Even in a case where a piece of data of a specification part allowed in advance to be changed is changed, the properness determination unit 32 can determine that the input construction model part is proper in a case where the summary value 23f set in advance in the elevator construction model part 22 is the same as the summary value calculated by the properness determination unit 32.

Also, when the file format is converted, the internal format of the data of the 3D shape 23a may be changed. Therefore, the elevator manufacturer may calculate the summary value 23f by extracting from the 3D shape data a bounding box or the like surrounding a main structure constituting the elevator such as an elevator shaft and a machine room that greatly affect installation of the elevator. In this manner, the elevator manufacturer calculates the summary value 23f on the basis of elements hardly affected by the file format. Therefore, it is possible to absorb a fine difference between the elevator construction model part 22 used in the client terminal 2 and the elevator construction model part 36 managed by the elevator manufacturer itself, and it is possible to determine that the elevator construction model part 22 used in the client terminal 2 is proper.

This is the end of description of the flow of processing for evaluating the construction model data 21 in the construction model data evaluation system 1B.

In the construction model data evaluation system 1B according to the second embodiment described above, the summary value 23f is set in the elevator construction model part 22. The summary value 23f is set in advance by the elevator manufacturer, and is a value that the elevator manufacturer knows in a case where the elevator construction model part 22 is proper. At the time of determining whether or not the elevator construction model part 22 included in the input construction model data 21 is proper, the construction model data evaluation server 3 confirms the summary value 23f acquired from the elevator construction model part 22.

In a case where the summary value 23f set in the elevator construction model part 22 matches the summary value calculated by the properness determination unit 32A using the secret key 37, the properness determination unit 32A can determine that the elevator construction model part 22 is proper. On the other hand, in a case where the summary value 23f and the summary value calculated by the properness determination unit 32A using the secret key 37 do not match, the properness determination unit 32A can determine that the elevator construction model part 22 is not proper. Based on the determination result, the construction model data evaluation server 3 can change evaluation processing to be executed thereafter and an evaluation result to be output depending on whether or not the elevator construction model part 22 is proper.

In addition, even in a case where the file format of the construction model data 21 has been converted, whether or not the elevator construction model part 22 is proper can be determined easily by limiting use information to be referred to when the summary value 23f is to be calculated. Another advantage is that a database of the construction model data 21 may not be provided to centrally manage the proper elevator construction model parts 22.

Third Embodiment

Next, a configuration example of a construction model data evaluation system according to a third embodiment of the present invention will be described with reference to FIG. 7. Detailed description of the parts already described in the first embodiment will be omitted. In the construction model data evaluation system according to the present embodiment, it is possible to determine whether or not the elevator construction model part is proper with reference to a summary value in a summary value database in which previously calculated summary values are recorded. Hereinbelow, a configuration example and an operation example of the construction model data evaluation system will be described.

Figure 7:
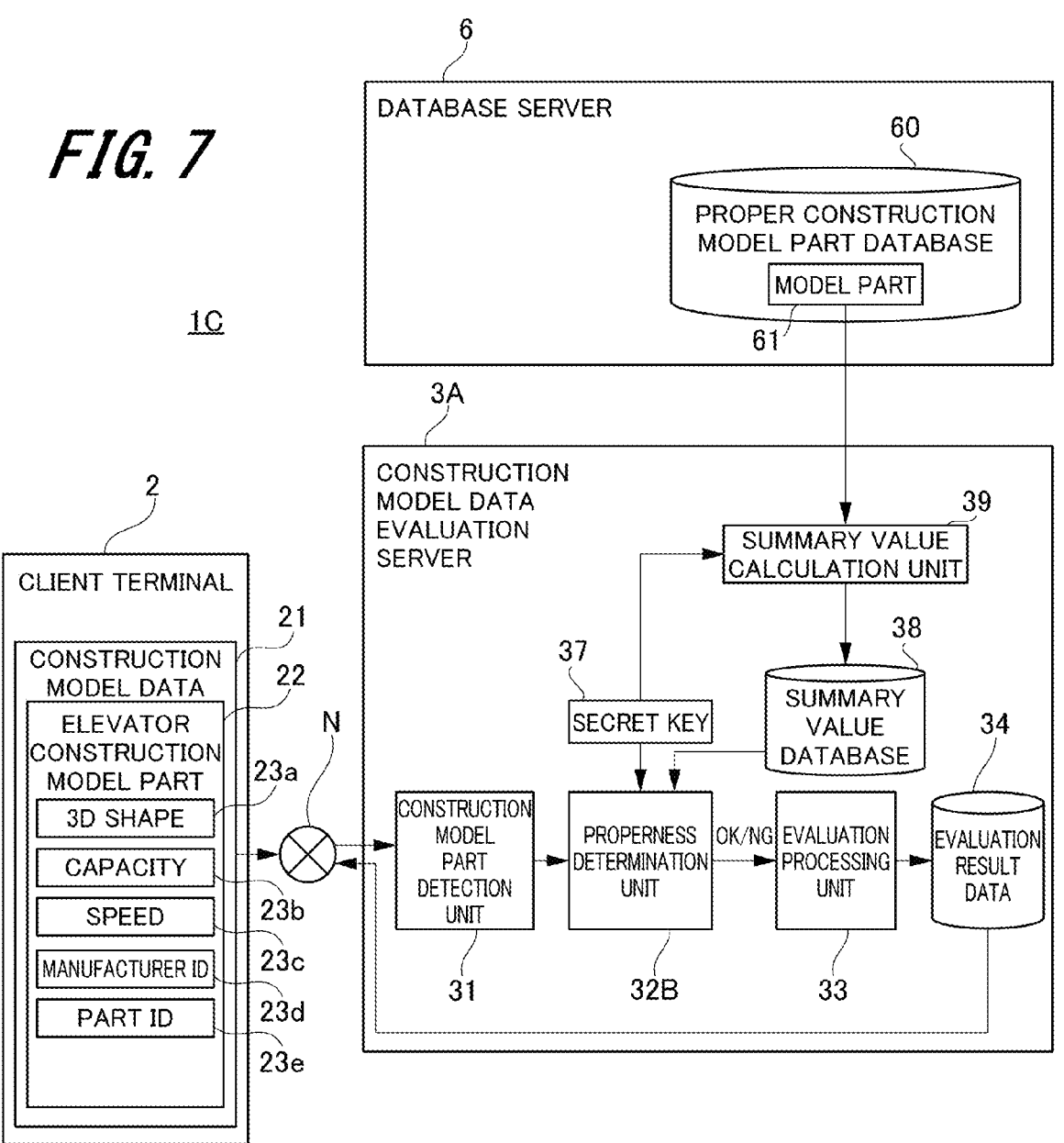
FIG. 7 is a block diagram illustrating a configuration example of a construction model data evaluation system according to a third embodiment of the present invention.

FIG. 7 is a block diagram illustrating a configuration example of a construction model data evaluation system 1C.

Similarly to the construction model data evaluation system 1 according to the first embodiment, the construction model data evaluation system 1C includes the client terminal 2 and a construction model data evaluation server 3A connected via the network N so as to be able to transmit and receive data, and further includes a database server 6.

The elevator construction model part 22 included in the client terminal 2 includes the 3D shape 23a, the capacity 23b, the speed 23c, the manufacturer ID 23d, and the part ID 23e. In this manner, the client terminal 2 according to the third embodiment does not include the summary value 23f in the elevator construction model part 22.

The database server 6 is a server configured separately from the construction model data evaluation server 3A, and can communicate only with the construction model data evaluation server 3A. The database server 6 includes a proper construction model part database 60 similar to the proper construction model part database 35 according to the first embodiment. That is, the proper construction model part database 60 stores a proper elevator construction model part 61 that can be provided by the elevator manufacturer to the user. The elevator construction model part 61 is the same as the proper elevator construction model part 22 according to the first embodiment. In the figure, the elevator construction model part 61 is abbreviated as a "model part".

The construction model data evaluation server 3 includes the elevator construction model part detection unit 31, a properness determination unit 32B, the evaluation processing unit 33, the evaluation result data 34, and the secret key 37, and further includes a summary value database 38 and a summary value calculation unit 39.

The summary value database 38 stores a summary value calculated by the summary value calculation unit 39.

The summary value calculation unit 39 accesses the database server 6 and acquires one or more proper elevator construction model parts 61 from the proper construction model part database 60. The summary value calculation unit 39 calculates a summary value using one or more proper elevator construction model parts 61 and the secret key 37. The summary value calculation unit 39 stores the calculated summary value in the summary value database 38. The summary value is associated with the part ID of the proper elevator construction model part 61 and is stored in the summary value database 38.

When the construction model data evaluation server 3 receives the construction model data 21 from the client terminal 2, the elevator construction model part detection unit 31 detects the elevator construction model part 22 from the construction model data 21. The properness determination unit 32B reads the secret key 37 and calculates a summary value of the elevator construction model part 22 on the basis of the specification information of the elevator construction model part 22.

Also, in a case where the summary value calculated using the input elevator construction model part 22 and the secret key 37 is included in the summary value database 38, the properness determination unit 32B determines that the input elevator construction model part 22 is proper. In this processing, first, the properness determination unit 32B refers to the summary value database 38 to acquire a summary value calculated in advance. Subsequently, the properness determination unit 32B determines whether the summary value calculated using the elevator construction model part 22 and the secret key 37 is the same as the summary value acquired from the summary value database 38.

The properness determination unit 32B determines that the elevator construction model part 22 to be used in the client terminal 2 is proper in a case where these summary values are the same, and determines that the elevator construction model part 22 is not proper in a case where the summary values are not the same. Subsequently, a determination result is output to the evaluation processing unit 33. In the evaluation processing unit 33, evaluation processing of the construction model data 21 as performed in the first embodiment is performed on the basis of the determination result, and the evaluation result data 34 is output to the client terminal 2.

In the construction model data evaluation system 1C according to the third embodiment described above, the summary value 23f is not set in the elevator construction model part 22. However, the summary value can be calculated as the properness determination unit 32B uses the secret key 37 for the elevator construction model part 22 detected by the elevator construction model part detection unit 31. Then, the properness determination unit 32B confirms whether the calculated summary value is stored in the summary value database 38.

In a case where the calculated summary value is stored in the summary value database 38, the properness determination unit 32B determines that the elevator construction model part 22 is proper. On the other hand, in a case where the calculated summary value is not stored in the summary value database 38, the properness determination unit 32B determines that the elevator construction model part 22 is not proper. Based on the determination result, the construction model data evaluation server 3 can change evaluation processing to be executed thereafter and an evaluation result to be output depending on whether or not the elevator construction model part 22 is proper.

Note that the construction model data evaluation system 1C may have a configuration in which the database server 6 is not provided, but in which the construction model data evaluation server 3 includes the proper construction model part database 60.

Modification Examples

Note that the construction model data evaluation system according to each of the above-described embodiments can also evaluate construction model data 21 for something other than the elevator. For example, the system may be used to evaluate the construction model data 21 for a passenger conveyor in terms of the operating speed, the number of passengers, and the like of the passenger conveyor.

Also, the evaluation result data 34 generated in a case where it is determined that the elevator construction model part 22 is not proper may include the proper elevator construction model part 22 together with notification of an error. As a result, for example, even in a case where the user mistakenly uses a non-proper elevator construction model part 22 although the user considers that the elevator construction model part 22 that the user uses is a proper one, the user can continue designing using a proper elevator construction model part 22 provided from the evaluation result data 34.

Also, the evaluation result data 34 may include link destination information indicating a uniform resource locator (URL) or the like of a site where the proper elevator construction model part 22 is stored. As a result, the client terminal 2 can acquire the proper elevator construction model part 22 from the site accessed through the URL at an arbitrary time.

Also, it is to be understood that the present invention is not limited to each of the above-described embodiments but can take various other application examples and modification examples without departing from the spirit and scope of the present invention described in the claims.

For example, each of the above-described embodiments specifically describes the configuration including the client terminal, the server, and the system in detail in order to facilitate understanding of the present invention and is not necessarily limited to one including the entire configuration described. Also, a part of the configuration of the embodiment described here can be replaced with the configuration of another embodiment, and furthermore, the configuration of another embodiment can be added to the configuration of a certain embodiment. Also, another configuration can be added to, deleted from, and replaced with a part of the configuration of each of the embodiments.

Also, control lines and information lines that are considered to be necessary for the description are illustrated, and not all of the control lines and information lines that are necessary as a product are illustrated. In practice, it may be considered that almost all of the components are connected to each other.

REFERENCE SIGNS LIST

1 Construction model data evaluation system
2 Client terminal
3 Construction model data evaluation server
21 Construction model data
22 Elevator construction model part
31 Construction model part detection unit
32 Properness determination unit
33 Evaluation processing unit
34 Evaluation result data
35 Proper construction model part database

The invention claimed is:

1. A construction model data evaluation server evaluating construction model data used in a client terminal, comprising:

a construction model part detection unit which receives the construction model data from a model part database that is separate from the construction model data evaluation server and detects a construction model part included in the construction model data;

a properness determination unit which performs properness determination on the construction model part; and an evaluation processing unit which transmits, to the client terminal, evaluation result data including an evaluation result obtained by evaluating the construction model data when a determination result of the properness determination and the construction model data are received, wherein, based on a determination that a summary value calculated using the construction model part which is input and a secret key is the same as the summary value preset in the construction model part, the properness determination unit determines that the construction model part which is input is proper, wherein the client terminal transmits an identifier of the construction model data to be used in the client terminal to the construction model data evaluation server, wherein the construction model part detection unit transmits the identifier to the model part database and receives the construction model data corresponding to the identifier searched by the model part database on a basis of the identifier and the construction model part which is proper included in the construction model data to perform properness determination on the construction model part, and wherein, based on a determination that the summary value preset in the construction model part is the same as the summary value calculated by the properness determination unit before and after a file format of the construction model data is changed, the properness determination unit determines that the construction model part which is input is proper.

2. The construction model data evaluation server according to claim 1, further comprising:

a proper construction model database which stores the construction model part which is proper, wherein, based on a determination that specification information of the construction model part matches specification information constituting the construction model part included in the proper construction model database in whole or in a predetermined part, the properness determination unit determines that the construction model part which is input is proper.

3. The construction model data evaluation server according to claim 1, wherein based on a determination that the summary value preset in the construction model part is the same as the summary value calculated by the properness determination unit, the properness determination unit determines that the construction model part which is input is proper.

4. A construction model data evaluation server evaluating construction model data used in a client terminal, comprising:

a construction model part detection unit which receives the construction model data from a model part database that is separate from the construction model data evaluation server and detects a construction model part included in the construction model data;

a properness determination unit which performs properness determination on the construction model part; and an evaluation processing unit which transmits, to the client terminal, evaluation result data including an evaluation result obtained by evaluating the construction model data when a determination result of the properness determination and the construction model data are received, wherein, based on a determination that a summary value calculated using the construction model part which is input and a secret key is the same as the summary value preset in the construction model part, the properness determination unit determines that the construction model part which is input is proper, wherein the client terminal transmits an identifier of the construction model data to be used in the client terminal to the construction model data evaluation server, wherein the construction model part detection unit transmits the identifier to the model part database and receives the construction model data corresponding to the identifier searched by the model part database on a basis of the identifier and the construction model part which is proper included in the construction model data to perform properness determination on the construction model part, and a summary value calculation unit which calculates the summary value using the construction model part the number of which is one or more and which is proper and the secret key; and a summary value database which stores the summary value calculated by the summary value calculation unit, wherein, based on a determination that the summary value calculated using the construction model part which is input and the secret key is included in the summary value database, the properness determination unit determines that the construction model part which is input is proper.

5. The construction model data evaluation server according to claim 1, wherein, based on a determination that the properness determination unit determines that the construction model part is not proper, the evaluation processing unit does not evaluate the construction model data.

6. The construction model data evaluation server according to claim 5, wherein, based on a determination that an elevator is represented by the construction model part, the parameters are setting values and effective values for speed and acceleration of an elevator car represented by the construction model part.

7. A construction model data evaluation method for evaluating construction model data used in a client terminal, comprising:

receiving, by a construction model data evaluation server, the construction model data from a model part database that is separate from the construction model data evaluation server, and detecting a construction model part included in the construction model data;

performing, by the construction model data evaluation server, a properness determination on the construction model part;

evaluating, by the construction model data evaluation server, the construction model data when a determination result of the properness determination and the construction model data are received; and transmitting, to the client terminal, evaluation result data including an evaluation result obtained by evaluating the construction model data, wherein the client terminal transmits an identifier of the construction model data to be used in the client terminal to the construction model data evaluation server, wherein a construction model part detection unit of the construction model data evaluation server transmits the identifier to the model part database and receives the construction model data corresponding to the identifier searched by the model part database on a basis of the identifier and the construction model part which is proper included in the construction model data to perform properness determination on the construction model part, and wherein, based on a determination that a summary value calculated using the construction model part which is input and a secret key is the same as the summary value preset in the construction model part, a properness determination unit of the construction model data evaluation server determines that the construction model part which is input is proper.

8. A construction model data evaluation system comprising:

a client terminal which uses construction model data;

a construction model data evaluation server which evaluates the construction model data, wherein the construction model data evaluation server includes:

a construction model part detection unit which receives the construction model data used in the client terminal and detects a construction model part included in the construction model data;

a properness determination unit which performs properness determination on the construction model part; and an evaluation processing unit which transmits, to the client terminal, evaluation result data including an evaluation result obtained by evaluating the construction model data when a determination result of the properness determination and the construction model data are received; and a model part database which is separate from the construction model data evaluation server and stores the construction model part, and wherein the client terminal outputs the evaluation result extracted from the evaluation result data received from the construction model data evaluation server, wherein the client terminal transmits an identifier of the construction model data to be used in the client terminal to the construction model data evaluation server, wherein the construction model part detection unit transmits the identifier to the model part database and receives the construction model data corresponding to the identifier searched by the model part database on a basis of the identifier and the construction model part which is proper included in the construction model data to perform properness determination on the construction model part, and wherein, based on a determination that a summary value calculated using the construction model part which is input and a secret key is the same as the summary value preset in the construction model part, the properness determination unit determines that the construction model part which is input is proper.

9. A construction model data evaluation server evaluating construction model data used in a client terminal, comprising:

a construction model part detection unit which receives the construction model data from a model part database that is separate from the construction model data evaluation server and detects a construction model part included in the construction model data;

a properness determination unit which performs properness determination on the construction model part; and an evaluation processing unit which transmits, to the client terminal, evaluation result data including an evaluation result obtained by evaluating the construction model data when a determination result of the properness determination and the construction model data are received, wherein, based on a determination that a summary value calculated using the construction model part which is input and a secret key is the same as the summary value preset in the construction model part, the properness determination unit determines that the construction model part which is input is proper, wherein the client terminal transmits an identifier of the construction model data to be used in the client terminal to the construction model data evaluation server, wherein the construction model part detection unit transmits the identifier to the model part database and receives the construction model data corresponding to the identifier searched by the model part database on a basis of the identifier and the construction model part which is proper included in the construction model data to perform properness determination on the construction model part, and wherein, based on a determination that the properness determination unit determines that the construction model part is not proper, the evaluation processing unit includes, in the evaluation result data, the evaluation result in which a variation in result of a simulation performed with different parameters from those used in an evaluation for the construction model part determined to be proper.

*   *   *   *   *